US007336155B2

(12) United States Patent
Petznick et al.

(10) Patent No.: US 7,336,155 B2
(45) Date of Patent: Feb. 26, 2008

(54) REMOTE CONTROL DEVICE FOR A MOTOR VEHICLE

(75) Inventors: Frank Petznick, Braunschweig (DE); Mathias Pietsch, Königslutter (DE)

(73) Assignee: Volkswagen AG, Wolfsburg (DE)

(*) Notice: Subject to any disclaimer, the term of this patent is extended or adjusted under 35 U.S.C. 154(b) by 329 days.

(21) Appl. No.: 09/968,438

(22) Filed: Oct. 1, 2001

(65) Prior Publication Data

US 2002/0027520 A1 Mar. 7, 2002

Related U.S. Application Data

(63) Continuation of application No. PCT/EP00/02096, filed on Mar. 10, 2000.

(30) Foreign Application Priority Data

Apr. 14, 1999 (DE) ................................ 199 16 847

(51) Int. Cl.
*G05B 19/00* (2006.01)

(52) U.S. Cl. ................. 340/10.32; 340/5.61; 340/5.64; 340/3.1; 340/426.1; 340/426.23; 340/5.1; 340/5.2; 340/825.69; 340/825.72

(58) Field of Classification Search ........... 340/825.72, 340/5.23, 5.26, 825.52, 825.69, 426.15, 457, 340/5.61–5.64, 5.72, 825.7, 10.32, 426.23, 340/5.62, 3.1, 426.16, 5.1, 5.2, 425.5, 426.1; 701/29–35, 2, 36, 51; 307/9.1; 341/17; 324/752

See application file for complete search history.

(56) References Cited

U.S. PATENT DOCUMENTS 4,055,772 A * 10/1977 Leung ........................ 307/10.1
4,583,262 A * 4/1986 Werner ......................... 16/300
4,697,092 A * 9/1987 Roggendorf et al. ....... 307/10.1
4,731,605 A * 3/1988 Nixon ........................ 341/176
4,760,275 A * 7/1988 Sato et al. ................. 307/10.1
4,843,639 A * 6/1989 Beals ......................... 398/111
4,887,064 A * 12/1989 Drori et al. ................ 340/5.23
5,278,759 A * 1/1994 Berra et al. .................... 701/1
5,289,182 A * 2/1994 Brillard et al. ............. 340/902
5,448,479 A * 9/1995 Kemner et al. ............... 701/23
5,475,818 A * 12/1995 Molyneaux et al. ........ 709/208
5,555,498 A * 9/1996 Berra et al. .................... 701/33
5,699,055 A * 12/1997 Dykema et al. ....... 340/825.22
5,708,415 A 1/1998 Van Lente et al. .......... 340/525
5,719,551 A * 2/1998 Flick ..................... 340/426.25

(Continued)

FOREIGN PATENT DOCUMENTS

DE 4328392 3/1995

(Continued)

*Primary Examiner*—Brian Zimmerman
*Assistant Examiner*—Vernal Brown
(74) *Attorney, Agent, or Firm*—Baker Botts L.L.P.

(57) ABSTRACT

A remote control for a garage door opener includes a transmitter for transmitting electromagnetic signals and at least one manual actuator. The transmitter can be arranged in flexible mounting areas inside or outside the motor vehicle and can be spatially separate from the manual actuator. To this end, the invention provides a remote garage door opener that is integrated into the control system that is present in a motor vehicle in such a manner that the manual actuator and the transmitter device are linked with each other via at least one control device that is located in the motor vehicle.

18 Claims, 1 Drawing Sheet

U.S. PATENT DOCUMENTS

| | | | | | |
|---|---|---|---|---|---|
| 5,760,587 | A * | 6/1998 | Harvey | 324/434 |
| 5,870,018 | A * | 2/1999 | Person et al. | 340/5.65 |
| 5,940,007 | A * | 8/1999 | Brinkmeyer et al. | 340/825.69 |
| 6,005,508 | A * | 12/1999 | Tsui | 341/173 |
| 6,112,152 | A * | 8/2000 | Tuttle | 701/115 |
| 6,141,610 | A * | 10/2000 | Rothert et al. | 701/35 |
| 6,362,771 | B1 * | 3/2002 | Schofield et al. | 341/176 |
| 6,529,124 | B2 * | 3/2003 | Flick | 340/426.1 |
| 6,622,070 | B1 * | 9/2003 | Wacker et al. | 701/29 |

FOREIGN PATENT DOCUMENTS

| | | |
|---|---|---|
| DE | 19505924 | 8/1996 |
| DE | 19528099 | 2/1997 |
| DE | 19607017 | 8/1999 |
| EP | 0610711 | 8/1974 |
| EP | 0689964 | 1/1996 |
| EP | 0728896 | 8/1996 |
| EP | 0816599 | 1/1998 |
| EP | 0689963 | 9/1998 |

* cited by examiner

REMOTE CONTROL DEVICE FOR A MOTOR VEHICLE

This application is a continuation of application PCT/EP00/02096 filed Mar. 10, 2000.

BACKGROUND OF THE INVENTION

The invention relates to a remote control device for a motor vehicle for operating electrical appliances, such as a garage door opener or lighting, with at least one manual activation device and a transmitter that emits electromagnetic signals, wherein the transmitted signals can be received by a remote receiver and operate an electric motor drive or other electrical appliances.

The transmitters in this context are usually designed as separate units and are equipped with an activation device, generally in the form of one or more switch buttons for the relevant electrical appliance. When the transmitter is activated via the relevant activation device, it emits electromagnetic signals which are received and detected, for example by the receiver of a door operator. When such signals are transmitted by the appropriate transmitter, the corresponding operator is activated, and the door is opened or closed.

Since such transmitters, installed in hand-held units, can be accommodated in a variety of locations inside the vehicle or in articles of clothing, a certain amount of searching is often required in order to be able to use the remote control device. Consequently, DE 195 05 924 A 1 has already proposed a transmitter for vehicles that radiates electromagnetic signals wherein the remote control unit is designed as a unit built into a vehicle that can operated by the driver or other occupants and is connected to the transmitter.

Thus, it has also been proposed to design such remote control units for garage doors so that the transmitter in question is located inside the vehicle.

EP 0,689,963 B 1 discloses a garage door control with an electric transmitter that is accommodated inside the mirror housing in the interior of the vehicle. The mirror housing has a storage space for at least one part of a garage control wherein the storage space can be closed with a cover that is detachably joined to the mirror housing and together with the other part of the housing forms the complete mirror housing, wherein the cover is permeable to signals emitted by the garage door controller, and the garage door controller itself has a transmitter for the signals.

EP 0,689,964 A 1 also relates to a remote interface control unit to control opening and closing of garage doors which can be accommodated in a recess in the vehicle top or in a recess in the sun visor connected to the vehicle top, when the sun visor is in its stored position. Alternatively, it has been proposed to design the remote interface control unit such that takes on the shape of part of the sun visor and is attached to the vehicle top such that the remote control unit encloses part of the sun visor.

A device for controlling various vehicle functions and a garage door opener is known from U.S. Pat. No. 5,708,415. In addition to a remote control device for the vehicle functions, the device also contains a remote control for the garage door opener. Both remote controls communicate via radio with a transceiver, which is located in the vehicle interior, for example on the interior mirror, and sends appropriately coded RF signals to the garage door opener The problem in use of such control units is that when they are located in the interior of a vehicle as described, the transmitter output is significantly degraded since vehicles increasingly use metallized windows which significantly reduce range or make radio transmission impossible.

It is therefore an object of the present invention to develop a remote control device, wherein the transmitter can be installed in or on the vehicle, independently of the manual activation switch, in such a way as to ensure that the transmitter has the necessary range for operating the garage door opener.

SUMMARY OF THE INVENTION

In accordance with the invention, provision is made for a manual activation switch and a transmitter that emits electromagnetic signals to be connected to one another by at least one interface control unit present in the motor vehicle.

Thus a remote control device for an electrical appliance is provided in which the transmitter is separated from the activation device in the broadest sense, and thus can be installed in a wide variety of locations inside and outside a motor vehicle.

A preferred embodiment of the invention provides for using an existing interface control unit as a serial interface, for connecting the manual activation device and the transmitter.

In another embodiment, the transmitter is connected via a first interface control unit to a data bus internal to the vehicle, which data bus in turn is connected via a second interface control unit with the manual activation device, thus making it possible to separate the transmitter and the operating device by a large distance, even if the transmitter is located outside of the vehicle interior.

In accordance with a further development of the invention, the interface control unit is one which is used for other functions in the vehicle.

In order to select prescribed frequency bands or operating codes, a programmable electronic digital processor may be provided that is connected with the transmitter. According to a preferred embodiment of the invention, programming of the processor is accomplished via the motor vehicle's diagnostic interface. The diagnostic interface is preferably connected to the digital processor via the first interface control unit and the vehicle-internal data bus. This embodiment has the advantage that the digital processor need not be dismantled from the vehicle during programming.

Moreover, provision can be made to associate a display device with the manual activation device(s), which display reflects the operating state of the remote control device or of a remote electric motor drive.

The following example embodiments are used to describe the invention in detail.

DESCRIPTION OF THE INVENTION

Remote control device 1, hereinafter referred to as a "remote garage door opener," is arranged for remote control of electrical appliances, such as garage doors, gate or lighting and consists essentially of a transmitter 6 and a manual activation device 4 that has one or more controls. Such garage door openers are sufficiently known, for example from EP 816,599 A1 and EP 689,963 B1.

Figure 1:
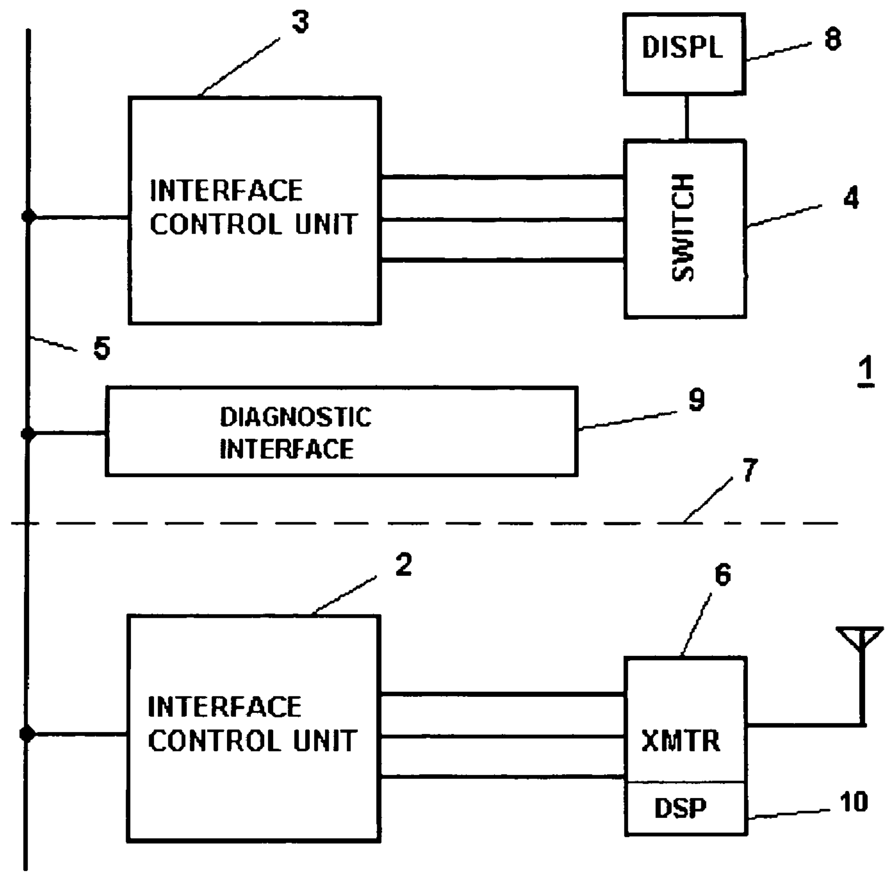
FIG. 1 is a block diagram of a first embodiment of a remote control device.

FIG. 1 shows the incorporation of such a garage door opener 1, that is known per se, into an existing control system of a motor vehicle, thus making it possible to create a spatial separation (indicated by dotted line 7) between the transmitter 6 and the manual activation device, switch 4, which makes it possible to position the manual switch 4 in the interior of the vehicle, for example on the sun visor or in any other desired location, and to position the transmitter 6 outside, for example on the vehicle front bumper.

In accordance with the exemplary embodiment, the transmitter 6 is connected with a first interface control unit 2, which serves as a gateway or serial interface for the transmitter, to a data bus 5. The manual activation device 4 is connected to the data bus 5 by means of the second interface control unit 3. Preferably the interface control units 2 and 3 are existing interface control units that are already used for other purposes. However, it is also possible to provide an additional interface control unit 2, 3, particularly if no existing interface control unit is in the physical vicinity of the transmitter 6 or the manual activation device 4.

Furthermore, the invention makes it possible to integrate another manual activation device 4 in the device, for example for use by a passenger.

To display the operating state of the garage door opener 1 or of the electric motor drive, the manual activation unit may be additionally connected to an appropriate display device 8 which may be a light.

In addition, it is possible to integrate the garage door opener 1 directly into a diagnostic interface 9 connected to the data bus 5. The garage door opener can thereby be programmed to country-specific permissible frequencies without dismantling it from the vehicle. To this end, a digital processor 10 may be integrated in the transmitter 6.

Figure 2:
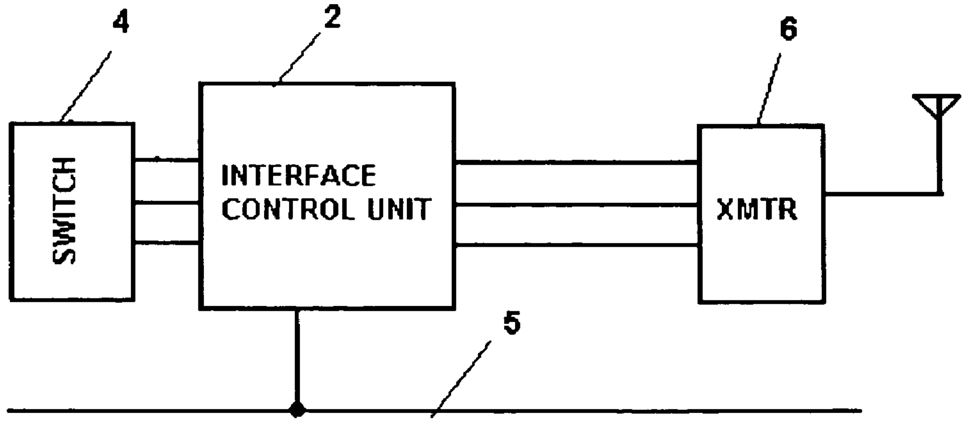
FIG. 2 is a block diagram of a second embodiment of a remote control device having only one interface control unit.

A simpler embodiment of the remote control device is shown in FIG. 2, in which the interface control unit 2 is located directly between the transmitter 6 and the manual activation switch 4. Here, too, the interface control unit 2 can be integrated into the functional control system of the vehicle via the data bus 5 in a manner analogous to that described above.

While there have been described what are believed to be the preferred embodiments of the invention, those skilled in the art will recognize that other and further changes can be made thereto without departing from the spirit of the invention, and it is intended to claim all such changes and modifications as fall within the true scope of the invention.

We claim:

1. An arrangement within a motor vehicle comprising:

a remote control comprising a transmitter and a manual activation device;

a data bus arranged within said vehicle for connecting a plurality of remotely located data bus interface control units coupled with said data bus;

wherein the manual activation device is located inside the vehicle and coupled with a first of said data bus interface control unit; and wherein the transmitter is located outside the vehicle interior coupled with a second of said data bus interface control unit, wherein said first and second interface are located at different positions within said motor vehicle.

2. A remote control device as specified in claim 1, wherein said first and second interface control units are serial interfaces.

3. Apparatus as specified in claim 1, wherein at least one of said interface control units is used for other functions in said vehicle.

4. Apparatus as specified in claim 1, wherein said transmitter includes a digital processor for configuring said transmitter.

5. Apparatus as specified in claim 4, wherein said vehicle include a diagnostic interface coupled with said data bus, wherein said second interface control unit connects to said diagnostic interface and wherein said digital processor is configurable by configuration signals supplied thereto via said second interface control unit from said diagnostic interface.

6. Apparatus as specified in claim 1 further including a display device associated with said manual activation device.

7. Apparatus as specified in claim 5 wherein the digital processor is operable to select prescribed frequency bands for said transmitter.

8. Apparatus as specified in claim 5 wherein the digital processor is operable to select operating codes for said transmitter.

9. Apparatus as specified in claim 7 wherein a selected frequency band is programmed via said diagnostic interface.

10. Apparatus as specified in claim 8 wherein a selected operating code is programmed via said diagnostic interface.

11. Apparatus as specified in claim 1 further comprising another manual activation device coupled with said data bus.

12. An arrangement within a motor vehicle comprising:

a remote control device comprising a transmitter and a manual switch for operating said transmitter;

a serial data bus arranged within said vehicle for connecting a plurality of remotely located serial data bus interface control units coupled with said serial data bus;

wherein the manual switch is located inside the vehicle and coupled with a first of said serial data bus interface control units;

wherein the transmitter including a digital processor for configuring said transmitter, is located outside the vehicle interior coupled with a second of said serial data bus interface control units, wherein said first and second serial interfaces are located at different positions within said motor vehicle.

13. Apparatus as specified in claim 12, wherein at least one of said interface control units is used for other functions in said vehicle.

14. Apparatus as specified in claim 12 further including a display device associated with said manual switch.

15. Apparatus as specified in claim 12 wherein the digital processor is operable to select prescribed frequency bands for said transmitter.

16. Apparatus as specified in claim 12 wherein the digital processor is operable to select operating codes for said transmitter.

17. Apparatus as specified in claim 15 wherein a selected frequency band is programmed via a diagnostic interface.

18. Apparatus as specified in claim 16 wherein a selected operating code is programmed via a diagnostic interface.

* * * * *